(12) United States Patent
Dureau et al.

(10) Patent No.: US 9,942,600 B2
(45) Date of Patent: *Apr. 10, 2018

(54) CREATING COVER ART FOR MEDIA BROWSERS

(71) Applicant: GOOGLE LLC, Mountain View, CA (US)

(72) Inventors: Vincent Dureau, San Francisco, CA (US); Nathan Leslie Sandland, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/194,523

(22) Filed: Jun. 27, 2016

(65) Prior Publication Data

US 2016/0309216 A1 Oct. 20, 2016

Related U.S. Application Data

(63) Continuation of application No. 14/351,529, filed as application No. PCT/US2012/060095 on Oct. 12, 2012, now Pat. No. 9,380,333.

(Continued)

(51) Int. Cl.

| | |
|---|---|
| *H04N 5/445* | (2011.01) |
| *H04N 21/431* | (2011.01) |
| *H04N 21/462* | (2011.01) |
| *H04N 21/482* | (2011.01) |
| *G06F 17/30* | (2006.01) |
| *G11B 27/10* | (2006.01) |
| *H04N 21/81* | (2011.01) |

(Continued)

(52) U.S. Cl.
CPC ..... *H04N 21/4316* (2013.01); *G06F 17/3005* (2013.01); *G06F 17/30038* (2013.01);
(Continued)

(58) Field of Classification Search
CPC .......... H04N 21/4316; H04N 21/4312; H04N 21/4622; H04N 21/4828
(Continued)

(56) References Cited

U.S. PATENT DOCUMENTS

| | | |
|---|---|---|
| 6,123,362 A | 9/2000 | Squilla et al. |
| 6,185,329 B1 | 2/2001 | Zhang et al. |

(Continued)

FOREIGN PATENT DOCUMENTS

| | | |
|---|---|---|
| JP | 2003-348559 | 12/2003 |
| JP | 2012-530314 | 11/2012 |

(Continued)

OTHER PUBLICATIONS

Google Inc., Communication pursuant to Article 94(3) EPC, EP12839291.7, Feb. 4, 2016, 6 pgs.

(Continued)

*Primary Examiner* — Jivka Rabovianski
(74) *Attorney, Agent, or Firm* — Morgan, Lewis & Bockius LLP

(57) ABSTRACT

Displaying art work or thumbnail images representative of movies, television (TV) programs/episodes and other media content is an appealing and often intuitive way of displaying available media content in a media content browser. However, computer displayable cover art is not necessarily available for all titles. For example, an older movie may not have computer displayable cover art because at the time the movie title was made available it was not anticipated that the movie title might be selectable through a media browser. After considering this description one will understand how the features of various implementations are configured to enable various systems, methods and devices to create computer displayable cover art or thumbnail images for media titles to be displayed by a media browser.

24 Claims, 7 Drawing Sheets

Related U.S. Application Data

(60) Provisional application No. 61/547,633, filed on Oct. 14, 2011.

(51) Int. Cl.
   *H04N 21/84* (2011.01)
   *G11B 27/11* (2006.01)
   *G11B 27/28* (2006.01)

(52) U.S. Cl.
   CPC .. *G06F 17/30817* (2013.01); *G06F 17/30849* (2013.01); *G11B 27/10* (2013.01); *H04N 21/4312* (2013.01); *H04N 21/4622* (2013.01); *H04N 21/4828* (2013.01); *H04N 21/8153* (2013.01); *H04N 21/84* (2013.01); *G11B 27/11* (2013.01); *G11B 27/28* (2013.01)

(58) Field of Classification Search
   USPC ...................................... 725/41, 36
   See application file for complete search history.

(56) References Cited

U.S. PATENT DOCUMENTS

| | | | |
|---|---|---|---|
| 2006/0230331 A1* | 10/2006 | Abanami | G06Q 30/02 715/234 |
| 2007/0127889 A1 | 6/2007 | Seo | |
| 2008/0154962 A1 | 6/2008 | Yu et al. | |
| 2008/0168365 A1 | 7/2008 | Chaudhri | |
| 2008/0295028 A1 | 11/2008 | Nagasaka et al. | |
| 2009/0049074 A1* | 2/2009 | Dara-Abrams | ... G06F 17/30017 |
| 2010/0229094 A1 | 9/2010 | Nakajima et al. | |

FOREIGN PATENT DOCUMENTS

| | | |
|---|---|---|
| KR | 2008-0058837 | 6/2008 |
| KR | 2010-0044185 | 4/2010 |
| WO | WO 2011/059157 | 5/2011 |
| WO | WO 2011/102826 | 8/2011 |

OTHER PUBLICATIONS

Google Inc., International Preliminary Report on Patentability, PCT/US2012/060095, dated Apr. 15, 2014, 7 pgs.

Google Inc., International Search Report / Written Opinion, PCT/US2012/060095, dated Mar. 21, 2013, 13 pgs.

Google Inc., Notice of Final Rejection, KR 2014-7012933, dated Nov. 18, 2015, 5 pgs.

Google Inc., Notice to File a Response, KR 2014-7012933, dated May 21, 2015, 5 pgs.

Google Inc., Supplementary European Search Report, EP 12839291.7, dated Apr. 10, 2015, 7 pgs.

* cited by examiner

CREATING COVER ART FOR MEDIA BROWSERS

CROSS REFERENCE TO RELATED APPLICATIONS

This Application is a continuation of U.S. patent application Ser. No. 14/351,529 filed on Apr. 11, 2014, which is a United States National Stage Application filed under 35 U.S.C. § 371 of PCT Patent Application Serial No. PCT/US2012/060095 filed on Oct. 12, 2012, which claims the benefit of and priority to U.S. Provisional Patent Application No. 61/547,633 filed on Oct. 14, 2011, which are hereby incorporated by reference in their entireties.

TECHNICAL FIELD

The disclosed implementations relate generally to systems, methods and devices configured to create cover art for media content displayable by a media browser.

BACKGROUND

Displaying art work or thumbnail images representative of movies, television (TV) programs/episodes and other media content is an appealing and often intuitive way of displaying available media content in a media content browser. However, computer displayable cover art is not necessarily available for all titles. For example, an older movie may not have computer displayable cover art because at the time the movie title was made available it was not anticipated that the movie title might be selectable through a media browser.

Prior solutions to this problem are ad hoc and burden the end user. For example, one possible solution is to allow a user to supply cover art or a thumbnail image for titles lacking cover art. In other words, the user is forced to become a curator for the content that the user is attempting to sort through in order to identify media content to view or listen to. This task is wholly inconvenient for users that merely want to find media content to view or listen to. Moreover, the task can become extraordinarily burdensome when the user is attempting to search through large libraries of media content.

SUMMARY

The aforementioned deficiencies and other problems are reduced or eliminated by the disclosed systems, methods and devices. Various implementations of systems, methods and devices within the scope of the claims each have several aspects, no single one of which is solely responsible for the desirable attributes described herein. Without limiting the scope of the claims, some prominent features of example implementations are described herein. After considering this description one will understand how the features of various implementations are configured to enable various systems, methods and devices to create computer displayable cover art or thumbnail images for media titles to be displayed by a media browser.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other effective aspects.

Figure 1:
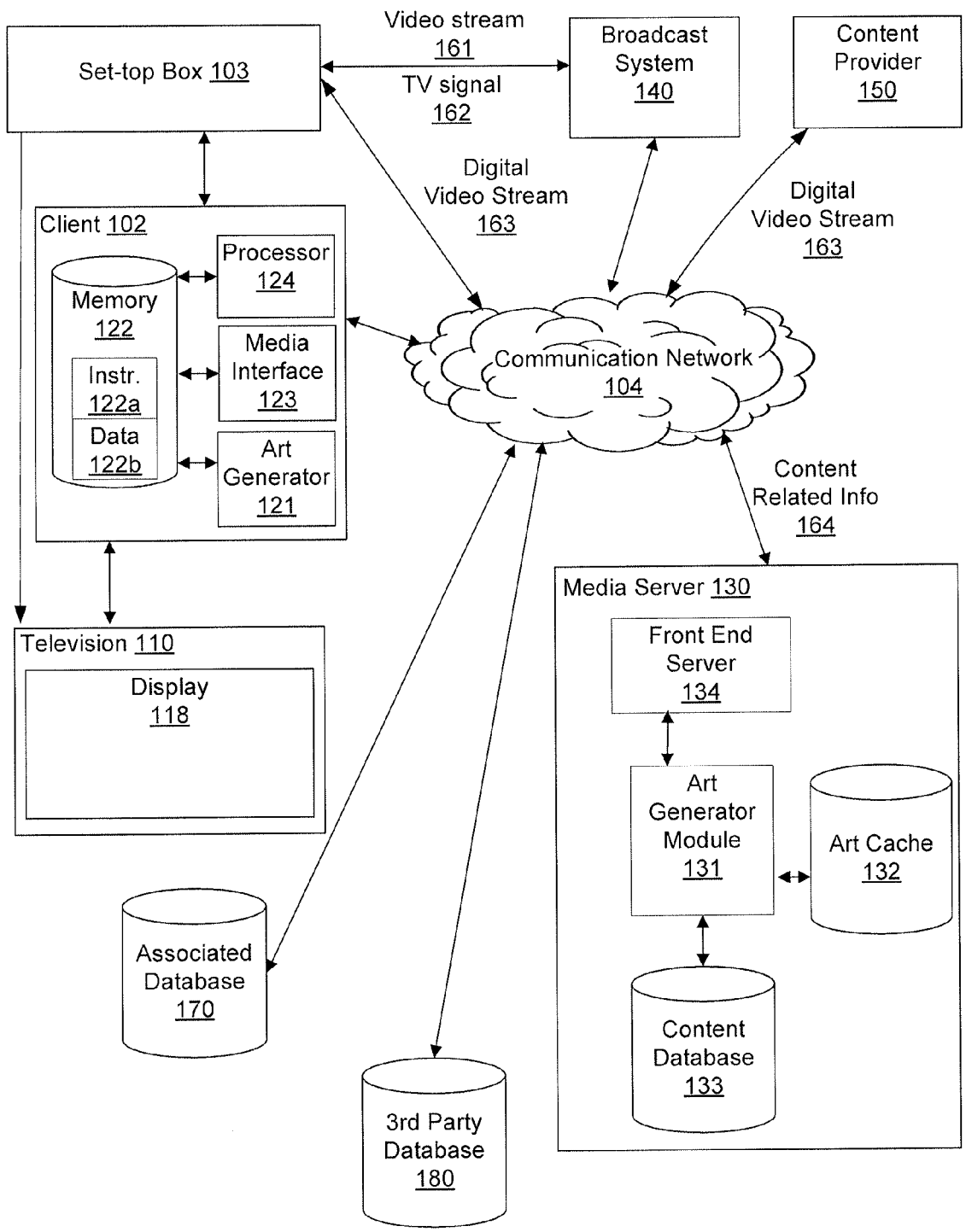
FIG. 1 is a block diagram of a client-server environment according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to various implementations, examples of which are illustrated in the accompanying drawings. In the following detailed description, numerous specific details are set forth in order to provide a thorough understanding of aspects of the implementations. However, the invention may be practiced without these specific details. In other instances, well-known methods, procedures, components, and circuits have not been described in detail so as not to unnecessarily obscure aspects of the disclosed implementations.

FIG. 1 is a block diagram of a simplified example client-server environment 100 according to some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a client device 102, a set-top box 103, a television (TV) 110, a communication network 104, a media server 130, a broadcast system 140, a content provider 150, an associated database 170 and a third party database 180. The client device 102, the set-top box 103, the media server 130, the broadcast system 140, the content provider 150, the associated database 170 and the third party database 180 are capable of being connected to the communication network 104 in order to exchange information with one another and/or other devices and systems.

In some implementations, the media server 130 is implemented as a single server system, while in other implementations it is implemented as a distributed system of multiple servers. Solely for convenience of explanation, the media server 130 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider is illustrated in FIG. 1 for the sake of brevity, those skilled in the art will appreciate from the present disclosure that fewer or more of each may be present in an implementation of a client-server environment.

The communication network 104 may be any combination of wired and wireless local area network (LAN) and/or wide area network (WAN), such as an intranet, an extranet, including a portion of the Internet. It is sufficient that the communication network 104 provides communication capability between the one or more client devices 102 and the media server 130. In some implementations, the communication network 104 uses the HyperText Transport Protocol (HTTP) to transport information using the Transmission Control Protocol/Internet Protocol (TCP/IP). HTTP permits client devices 102 to access various resources available via the communication network 104. However, the various implementations described herein are not limited to the use of any particular protocol.

In some implementations, the media server 130 includes a front end server 134 that facilitates communication between the media server 130 and the communication network 104. The front end server 134 receives content information 164 from the one or more client devices 102. As described in greater detail below with reference to FIGS. 3 and 4, in some implementations, the content information 164 is a metadata related to media content (e.g. a movie or TV program), a portion thereof, and/or a reference to a portion thereof. A reference to a portion of a video stream may include a time indicator and/or a digital marker referencing the content of the media content.

A content feed (or channel) is a resource or service that provides a list of content items that are present, recently added, or recently updated at a feed source. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. For example, the metadata may include a time-stamp or embedded selectable website links. The full version of the content may be any machine-readable data, including but not limited to web pages, images, digital audio, digital video, Portable Document Format (PDF) documents, and so forth.

In some implementations, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other implementations, other content syndication formats, such as the Atom syndication format or the VCALENDAR calendar format, may be used to specify content feeds.

In some implementations, the set-top box 103 is any suitable computer device capable of connecting to the communication network 104, receiving video streams, extracting information from video streams and presenting video streams for the display using the TV 110 (or another display device). For example, the set-top box 103 can be a set-top box for receiving cable TV and/or satellite TV, a digital video recorder (DVR), a digital media receiver, a TV tuner, a computer, and/or any other device that outputs TV signals. In some implementations, the set-top box 103 displays a video stream on the TV 110. In some implementations the TV 110 can be a conventional TV display that is not connectable to the Internet and that displays digital and/or analog TV content received via over the air broadcasts or a satellite or cable connection.

As is typical of televisions, the TV 110 includes a display 118 and speakers 119. Additionally and/or alternatively, the TV 110 can be replaced with another type of display device 108 for presenting video content to a user. For example, the display device may be a computer monitor that is configured to receive and display audio and video signals or other digital content from the set-top box 103. In some implementations, the display device is an electronic device with a central processing unit, memory and a display that is configured to receive and display audio and video signals or other digital content form the set-top box 103. For example, the display device can be a LCD screen, a tablet device, a mobile telephone, a projector, or other type of video display system. The display device can be coupled to the set-top box 103 via a wireless or wired connection.

In some implementations, the set-top box 103 receives video streams 161 via a TV signal 162. As used herein, a TV signal is an electrical, optical, or other type of data transmitting medium that includes audio and/or video components corresponding to a TV channel. In some implementations, the TV signal 162 is a terrestrial over-the-air TV broadcast signal or a sign distributed/broadcast on a cable-system or a satellite system. In some implementations, the TV signal 162 is transmitted as data over a network connection. For example, the client device 102 can receive video streams from an Internet connection. Audio and video components of a TV signal are sometimes referred to herein as audio signals and video signals. In some implementations, a TV signal corresponds to a TV channel that is being displayed on the TV 110.

In some implementations, the client device 102 is configured to support and/or supplement the operation of the set-top box 103 as it operates in combination with the TV 110. For example, the client device 102 may monitor the output of the set-top box 103 in order to provide additional and/or supplemental content associated with the content provided by the set-top box 103. More specifically, the client device 102 may provide additional information about particular movies or television programs or options to allow a user to select additional content associated with the playing movie or television program. In some implementations, the client device 102 also provides a media browser that can be displayed on the TV 110. The media browser, in some implementations, provides a graphical interface in which available movie titles or the like are displayed using computer displayable cover art or thumbnail images representative of the title. In some implementations, the client device 102 resides between the set-top box 103 and the TV 110 or is integrated with the TV 110, so that the client device 102 can overlay graphics on top of the video signal coming out of the set-top box 103. In some implementations, the client device 102 is configured to send commands to the set-top box 103 to tune to a particular channel or access a particular title on demand.

Figure 2:
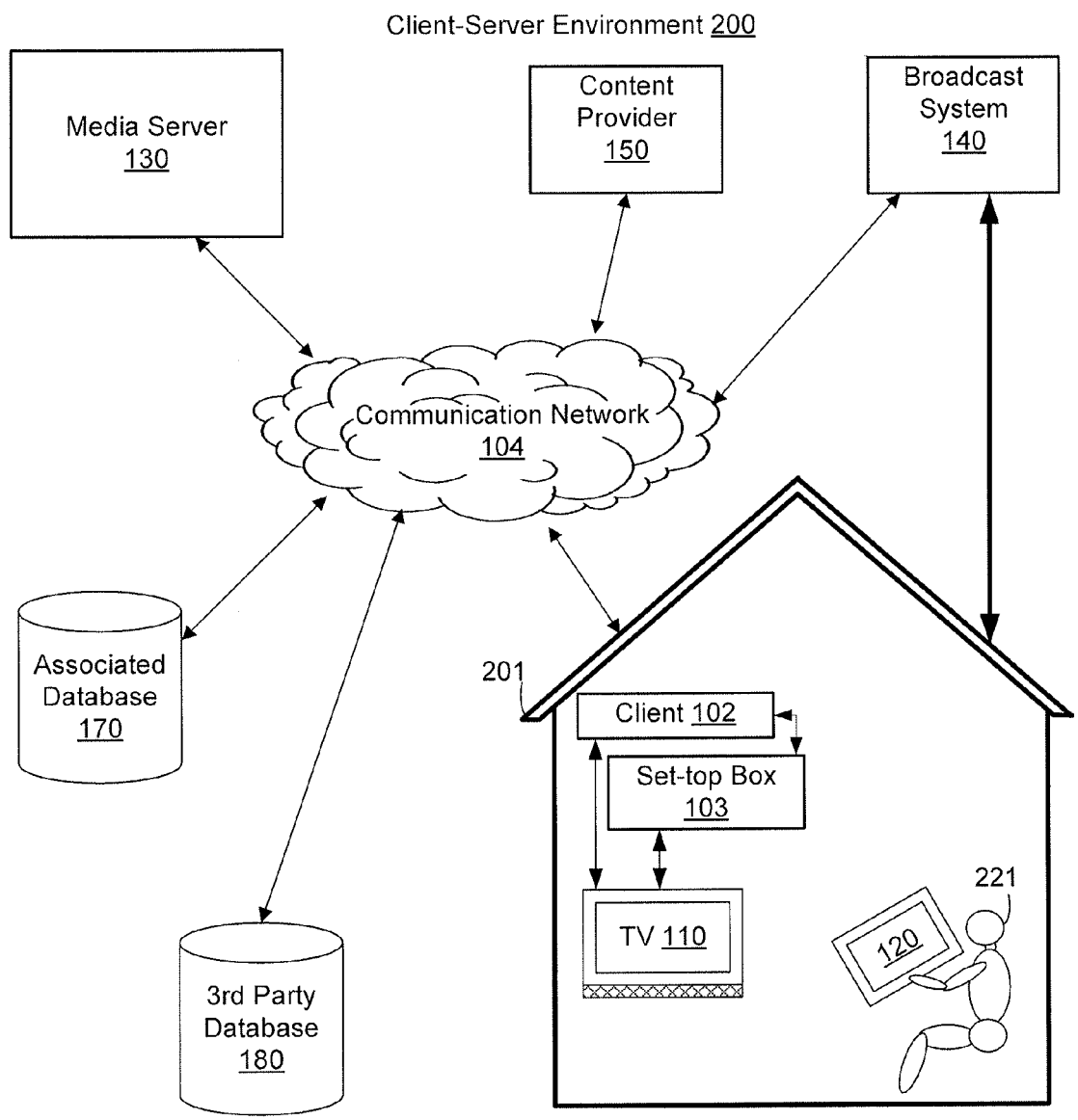
FIG. 2 is a block diagram of a client-server environment according to some implementations.

FIG. 2 is a block diagram of a client-server environment 200 according to some implementations. The client-server environment 200 illustrated in FIG. 2 is similar to and adapted from the client-server environment 100 illustrated in FIG. 1. Elements common to both share common reference indicia, and only the differences between the client-server environments 100, 200 are described herein for the sake of brevity.

As a non-limiting example, within the client-server environment 200, the client device 102, the set-top box 103, the TV 110 and an additional client device 120 (e.g. a tablet computer or laptop, etc.) are present together in a first residential location 201. In operation, the client device 102 receives information from the set-top box 103 associated with the media content presented on the TV 110. If the media content does not have associated cover art or a thumbnail image suitable for display by a media browser, the client device 102 then communicates a query to the media server 130. In some implementations, the client device 102 is configured to detect the media content playing on the TV 110 and report content associated with the media content playing on the TV 110 to the media server 130 so that the media server can form a query to retrieve relevant art to create cover art or a related thumbnail image. More specific details pertaining to how cover art or thumbnail images are created are described below with reference to the remaining drawings and continued reference to FIGS. 1 and 2.

Figure 3:
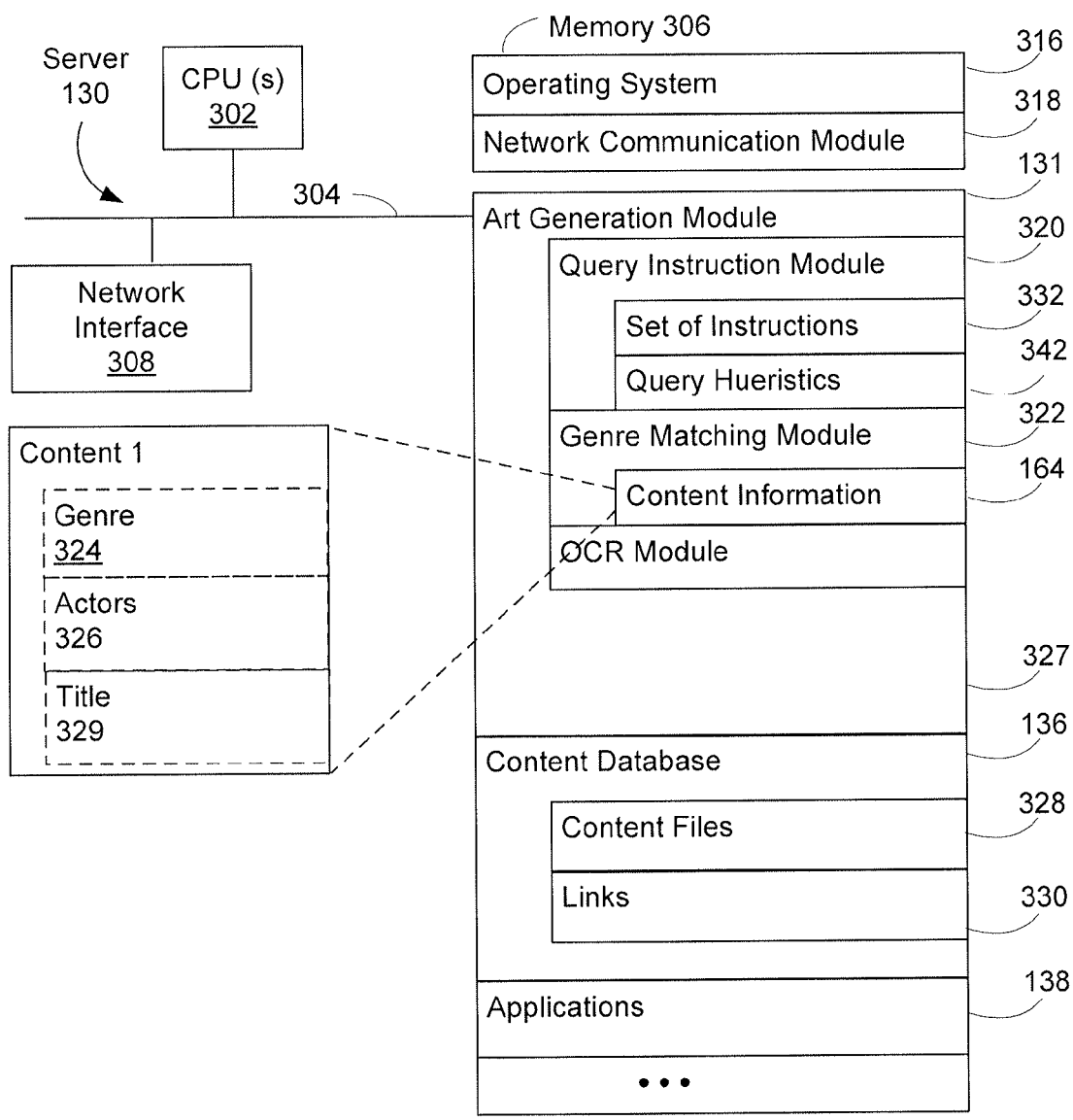
FIG. 3 is a block diagram of a configuration of a server system according to some implementations.

FIG. 3 is a block diagram of a configuration of the media server 130 according to some implementations. In some implementations, the media server 130 includes one or more processing units (CPU's) 302, one or more network or other communications interfaces 308, memory 306, and one or more communication buses 304 for interconnecting these and various other components. The communication buses 304 optionally include circuitry (sometimes called a chipset) that interconnects and controls communications between system components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, including the non-volatile and volatile memory device(s) within memory 306, comprises a non-transitory computer readable storage medium. In some implementations, memory 306 or the non-transitory computer readable storage medium of memory 306 stores the following programs, modules and data structures, or a subset thereof including an operation system 316, a network communication module 318, an art generation module 131, a content database 136, and applications 138.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on. With further reference to FIG. 1, the network communication module 318 may be incorporated into the front end server 134.

The content database 136 includes content files 328 and/or links to content files 230. In some implementations, the content database 136 stores advertisements, videos, images, music, web pages, email messages, SMS messages, a content feeds, advertisements, coupons, playlists, XML documents and any combination thereof. In some implementations, the content database 1376 includes links to advertisements, videos, images, music, web pages, email messages, SMS messages, content feeds, advertisements, coupons, playlists, XML documents and any combination thereof.

The art generation module 131 receives content information 164 from the client device 102, generates a set of instructions 332 and sends a set of instructions 332 to the client device 102. Additionally and/or alternatively, the media server 130 can receive content information 164 from the client device 102. The art generation module 131 includes an query instruction generation module 320, a genre matching module 322, a content correlation engine 323, and an optical character recognition (OCR) and code recognition module 327.

In some implementations, the OCR and code recognition module 327 is configured to apply an optical character recognition technique to video frames to determine information about the movie title, such as title and genre information.

The genre matching module 322 matches at least a portion of the content information 164 to metadata store locally or retrieved by a search engine. The metadata is sent to the query instruction generation module 320. The genre matching module 322 includes content information 164 received from at least the client device 102. The content information 164 includes genre information 324, a listing of actors 326 and a title information 329. In some implementations, the content information 164 also includes the year a movie or TV program was produced, and for a TV program the season and the number of particular episodes.

The query instruction generation module 320 generates a set of instructions 332 based on the available metadata in order submit a query that may retrieve relevant cover art or the like.

In some implementations, the set of instructions 332 includes instructions to execute and/or display one or more queries or the results of one or more queries on the client device 120. For example, when executed by the client device 102, the set of instructions 332 may cause the client device 102 to display an application that was minimized or running as a background process, or the set of instructions 132 may cause the client device 120 to execute the application. In some implementations, the set of instructions 332 include instructions that cause the client device 120 to download one or more content files 328 that may include relevant art. In some implementations the art generation module also prepares the artwork for display. In some implementations, the instructions 132 relate to generation and display of the art generation module. In some implementations the art generation module also stores the generated art for reuse and display in the Google TV user interface. In various implementations, the generated artwork can be cached at the server for future reuse or use by other users/viewers.

The applications 138 include one or more applications that can be executed on the client device 120. In some implementations, the applications include a media application, a feed reader application, a browser application, an advertisement application, a coupon book application and a custom application.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., trigger module 118) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3 shows a media server, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3 could be implemented on single servers and single items could be implemented by one or more servers. The actual number of servers used to implement the media server 130 and how features are allocated among them will vary from one implementation to another, and may depend in part on the amount of data traffic that the system must handle during peak usage periods as well as during average usage periods.

Figure 4:
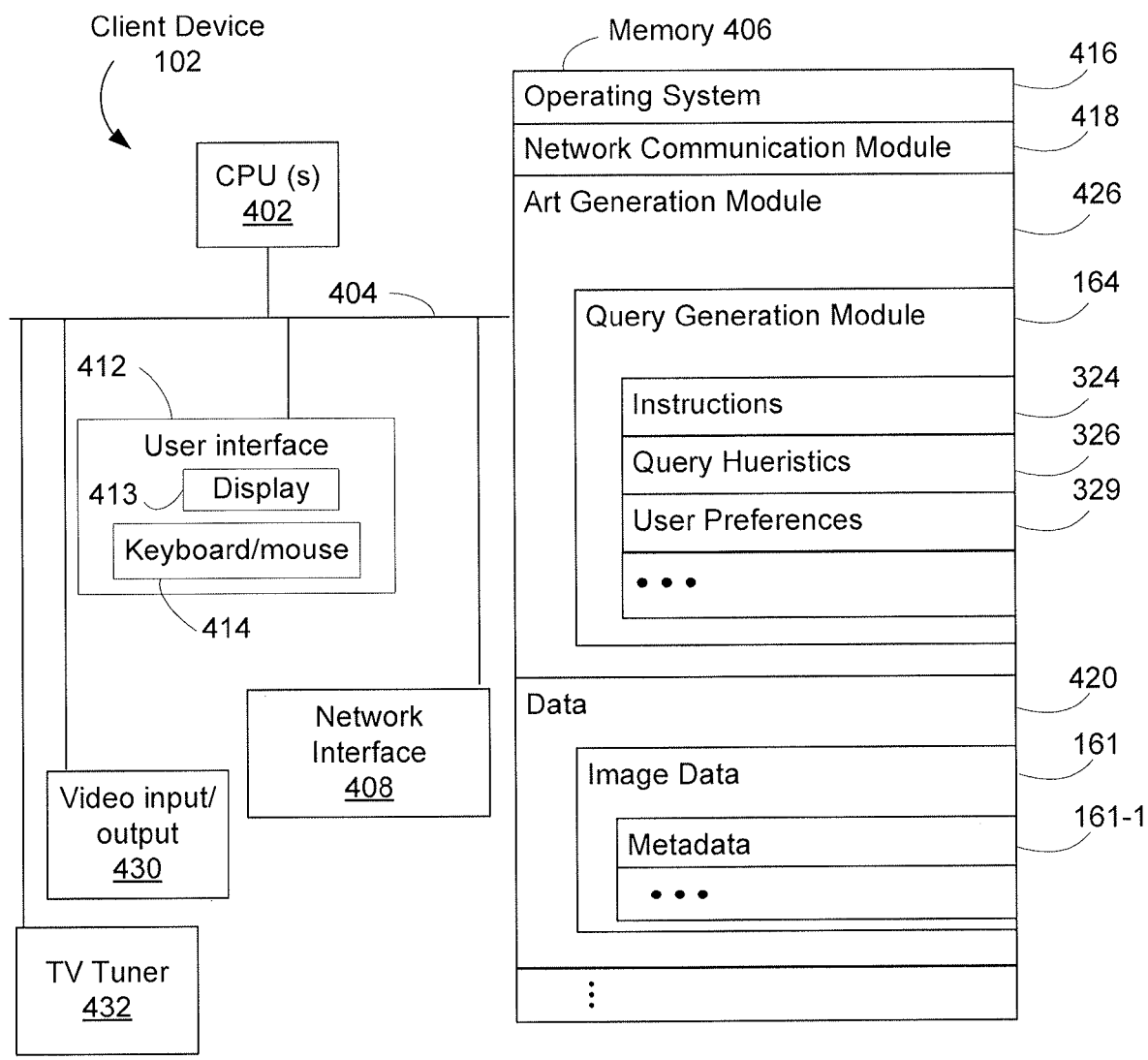
FIG. 4 is a block diagram of a configuration of a client device according to some implementations.

FIG. 4 is a block diagram of a configuration of the client device 102 according to some implementations. The client device 102 typically includes one or more processing units (CPU's) 402, one or more network or other communications interfaces 408, memory 406, and one or more communication buses 404, for interconnecting these and various other components. The communication buses 404 optionally include circuitry (sometimes called a chipset) that interconnects and controls communications between system components. The client device 102 may also include a user interface comprising a display device 413 and a keyboard and/or mouse (or other pointing device) 414. Memory 406 includes high-speed random access memory, such as DRAM, SRAM, DDR RAM or other, random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 306 store the following programs, modules and data structures, or a subset thereof including operation system 416, network communication module 418, an art generation module 426 and local data 420.

The client device 102 includes a video input/output 430 for receiving and outputting video streams. In some implementations, the video input/output 430 is configured to receive video streams from radio transmissions, satellite transmissions and cable lines. In some implementations the video input/output 430 is connected to a set top box. In some implementations, the video input/output 430 is connected to a satellite dish. In some implementations, the video input/output 430 is connected to an antenna.

In some implementations, the client device 102 includes a television tuner 432 for receiving video streams or TV signals.

The operating system 416 includes procedures for handling various basic system services and for performing hardware dependent tasks.

The network communication module 418 facilitates communication with other devices via the one or more communication network interfaces 404 (wired or wireless) and one or more communication networks, such as the Internet, other wide area networks, local area networks, metropolitan area networks, and so on.

The data 420 includes video streams 161.

The art generation module 426 derives content information 164 from a video stream 161 in order to determine if cover art or the like is required, and then either generates art or generates a query to retrieve relevant art. In some implementations, the content information 161 includes various types of metadata associated with the video stream, such a title, genre, etc. The user preferences 329 include a collection of display attributes that are preferred by a local user (e.g. the user 221). In some implementations, the content information is derived from a video stream. In some implementations, the content, information is derived from a service, such as TMS, that provides metadata for identified media content (media content that is responsive to a user search query or a predefined query, such as for popular media content items or for media content items that are similar to other media content items recently viewed by the user).

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 406 may store additional modules and data structures not described above.

Although FIG. 4 shows a client device, FIG. 4 is intended more as functional description of the various features which may be present in a client device than as a structural schematic of the implementations described herein. In practice, and as recognized by those of ordinary skill in the art, items shown separately could be combined and some items could be separated.

Figure 5:
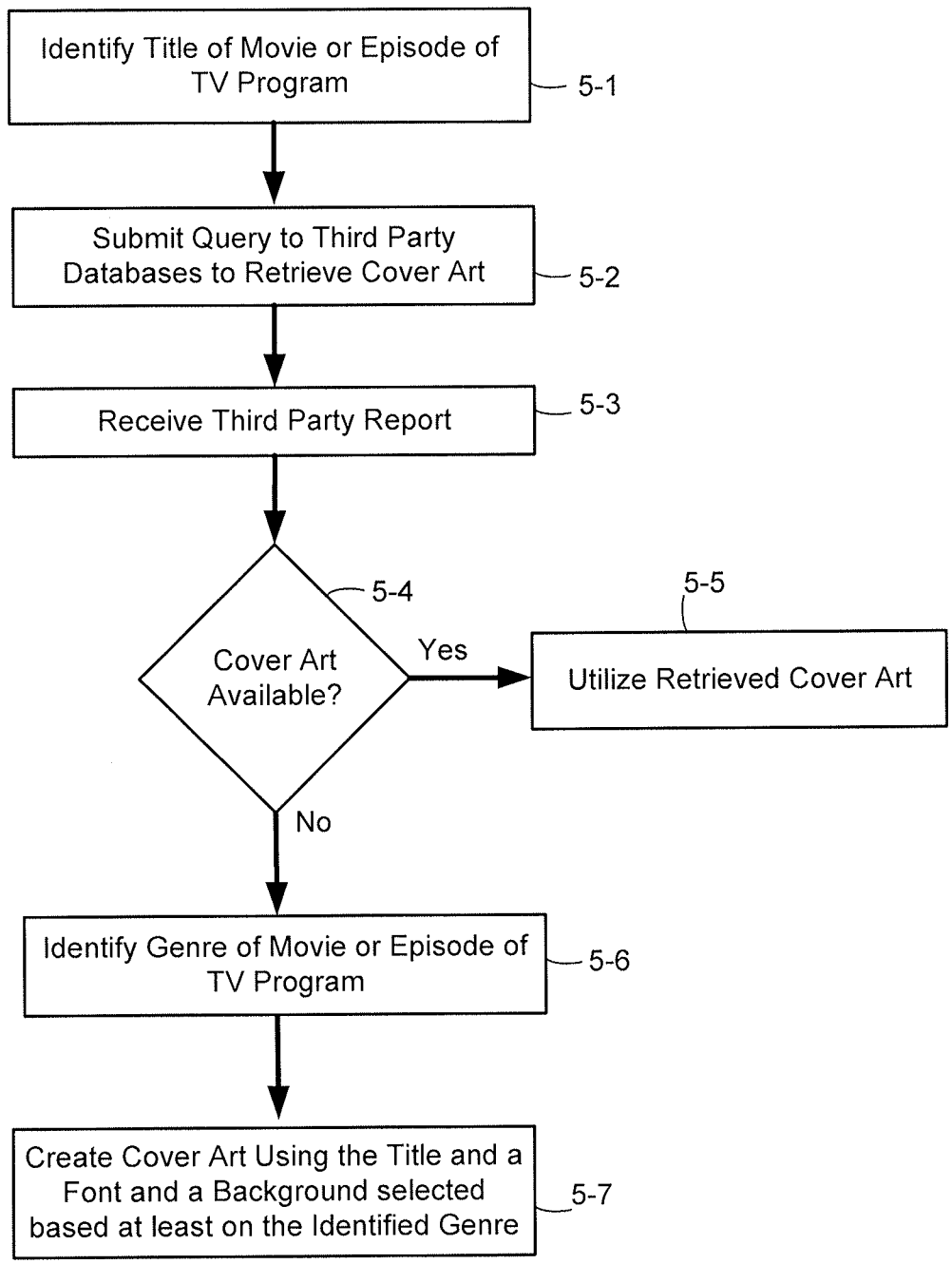
FIG. 5 is a flowchart representation of a method according to some implementations.

FIG. 5 is a flowchart representation of a method 500 according to some implementations. In some implementations, the method is performed by a client device or server in order to create cover art or a thumbnail image representative of a movie title or an episode of a TV program or the like. In other words, the method of creating cover art can be implemented on a client device or a server. For example, in some implementations, the method 500 is performed at least in part by the art generation module 131. As represented by block 5-1, the method includes identifying the movie title or the title of an episode of a TV program. In some implementations, identifying a title includes retrieving metadata. In some implementations, identifying a title includes performing a screen capture (i.e. a "screen scrape") associated with one or more frames of the media content, and applying an optical character recognition technique to extract the title from the opening credits or the like.

As represented by block 5-2, the method includes submitting a query to a third party database (e.g. the associated database 170 and the third party database 180). As represented by block 5-3, the method includes receiving search results from the third party database. As represented by block 5-4, the method includes determining whether or not cover art or the like is available from the database. If cover art or the like is available ("Yes", path from block 5-4), as represented by block 5-5, the method includes utilizing the retrieved cover art or the like as the computer displayable cover art. In turn, the cover art may be displayed by a media browser displayed to a user.

On the other hand, if cover art is not available ("No" path from block 5-4), as represented by block 5-6, the method includes identifying the genre of the movie or TV, program. In some implementations, the genre may be identified by accessing metadata associated with the title, or by searching for the genre based on the title and/or additional metadata. Subsequently, as represented by block 5-7, the method includes creating cover art using the title, and one or more of a respective font and/or a respective background, both of which are selected based at least on the identified genre. In some embodiments, the title font and/or the background used to represent media content items are selected to distinguish visually media content items associated with respective genres. In some embodiments, the title font and/or background are chosen without attempting to convey any associated meaning, of the genre. For example, the background image for "Sports" items might have blue and white horizontal stripes whereas "Mystery" items might have red circles on a gray background. In other embodiments, the title font and/or background are chosen to convey an associated meaning of the genre. For example, for media content items that are associated with the "Horror" genre, the font selected to represent the title of the media content items could have a gothic style and/or a background associated with horror content, such as the image of a bat, or a jagged pattern in color combinations associated with horror content (such as black and purple). As another example, media content items that are associated with the "Sports" genre could have a red and white striped background reminiscent of the red stitches and white leather of a baseball and/or a traditional font.

In some embodiments, the art generation module 131' generates the background used to represent a media content item. In some embodiments, the art generation module 131 issues a query to a web-based service, such as Google Image Search, to identify one or more images associated with the genre of a media content item, and selects one of those images as the background for cover art representing media content items of that genre. In some embodiments, the art generation module 131 can associate with cover art representing a media item of a particular genre a sound signature that is associated with that genre. In some embodiments, the sound signatures can be entirely computer generated. In other embodiments, the sound signatures can be sampled sounds or pre-recorded sound snippets, including sounds characteristic of a genre (e.g., a creaky door for media content items that are associated with the Horror genre).

Figure 6:
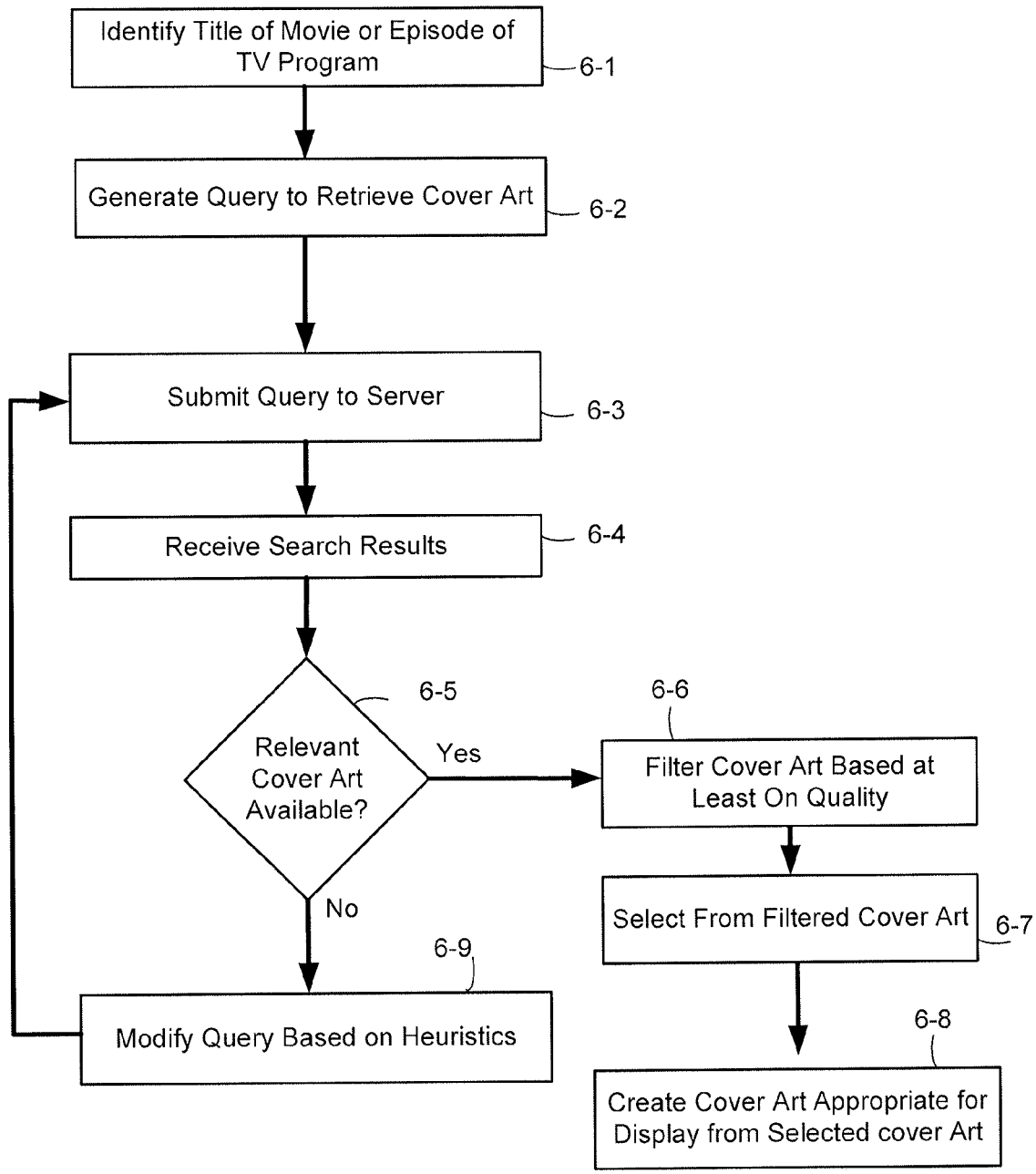
FIG. 6 is a flowchart representation of a method according to some implementations.

FIG. 6 is a flowchart representation of a method according to some implementations. In some implementations, the method is performed by a client device or server in order to create cover art or a thumbnail image representative of a movie title, an episode of a TV program or the like. As represented by block 6-1, the method includes identifying the movie title or the title of an episode of a TV program. In some implementations, identifying a title includes retrieving metadata. In some implementations, identifying a title includes performing a screen capture (i.e. a "screen scrape") associated with one or more frames of the media content, and applying an optical character recognition technique to extract the title from the opening credits or the like.

As represented by block 6-2, the method includes generating a search engine query to retrieve cover art. As represented by block 6-3, the method includes submitting a query to a server (e.g. media server 130). As represented by block 6-4, the method includes receiving search results from the server. As represented by block 6-5, the method includes determining whether or not cover art or the like is available. If cover art is not available ("No" path from block 6-5), as represented by block 6-9, the method includes modifying the query based on heuristics or the like, and then submitting the modified query as represented by block 6-3.

On the other hand, if cover art or the like is available ("Yes" path from block 6-5), as represented by block 6-6, the method includes filtering the retrieved cover art based at least on quality. In some implementations, other types of filtering may also be included in order to specifically adjust the type of cover art that is utilized. As represented by block 6-7, the method includes selecting cover art from the filtered results. As represented by block 6-8, the method optionally includes creating cover art from the selected cover art based at least on user preferences.

Figure 7:
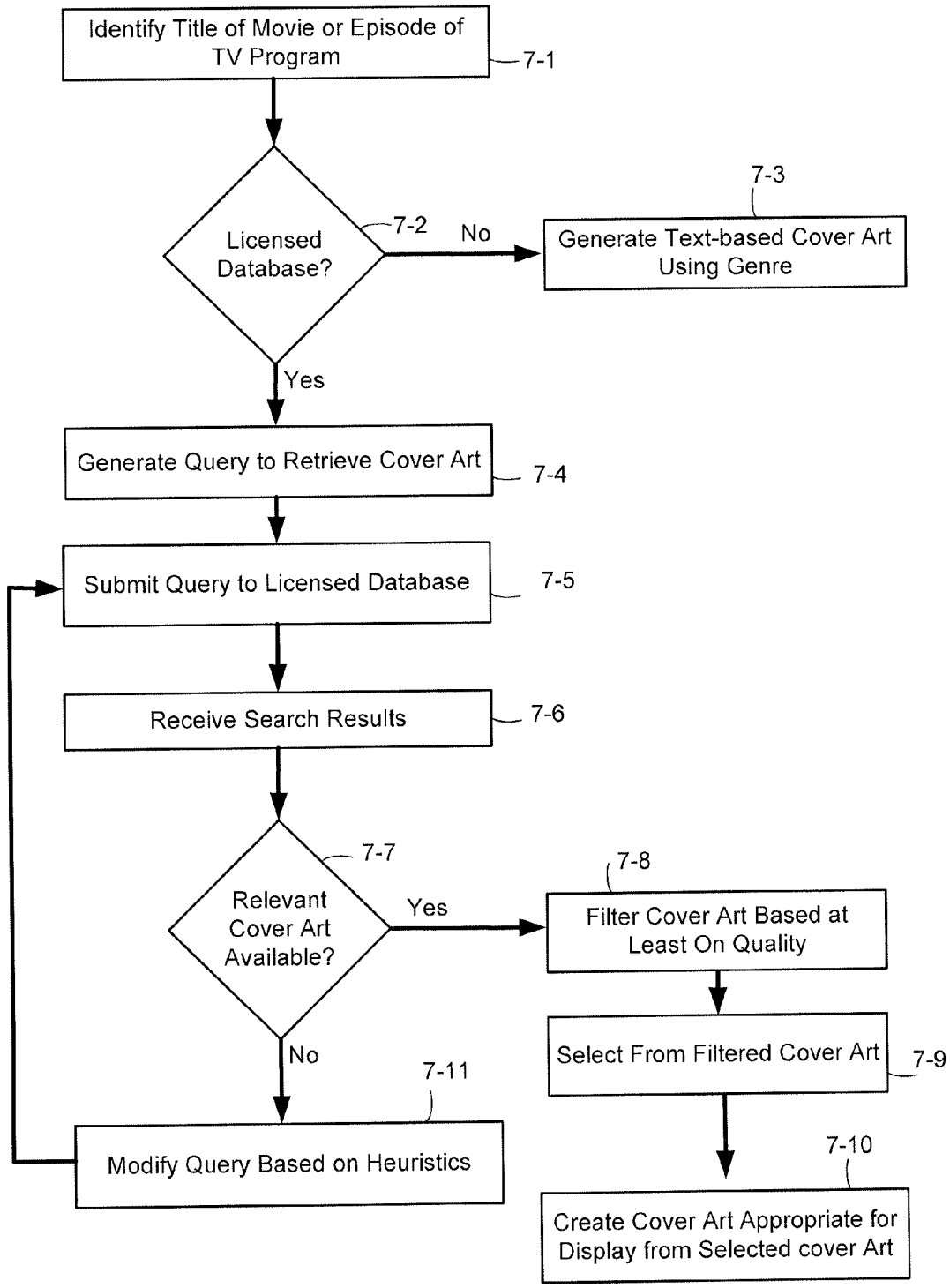
FIG. 7 is a flowchart representation of a method according to some implementations.

FIG. 7 is a flowchart representation of a method according to some implementations. In some implementations, the method is performed by a client device or server in order to create cover art or a thumbnail image representative of a movie title, an episode of a TV program or the like. As represented by block 7-1, the method includes identifying the movie title or the title of an episode of a TV program. In some implementations, identifying a title includes retrieving metadata. In some implementations, identifying a title includes performing a screen capture (i.e. a "screen scrape") associated with one or more frames of the media content, and applying an optical character recognition technique to extract the title from the opening credits or the like.

As represented by block 7-2, the method includes determining whether or not there is access to a licensed database including licensed computer displayable cover art. If a licensed database is not available ("No" path from block 7-2), as represented by block 7-3, the method includes generating text-based cover art using genre information (e.g. as described with reference to FIG. 5).

On the other hand, if a licensed database is available ("Yes" path from block 7-2), as represented by block 7-4, the method includes generating a search engine query to retrieve cover art. As represented by block 7-5, the method includes submitting a query to a server (e.g. media server 130). As represented by block 7-6, the method includes receiving search results from the server. As represented by block 7-7, the method includes determining whether or not cover art or the like is available. If cover art is not available ("No" path from block 7-7), as represented by block 7-11, the method includes modifying the query based on heuristics or the like, and then submitting the modified query as represented by block 7-5.

On the other hand, if cover art or the like is available ("Yes" path from block 7-7), as represented by block 7-8, the method includes filtering the retrieved cover art based at least on quality. In some implementations, other types of filtering may also be included in order to specifically adjust the type of cover art that is utilized. As represented by block 7-9, the method includes selecting cover art from the filtered results. As represented by block 7-10, the method optionally includes creating cover art from the selected cover art based at least on user preferences.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for generating computer displayable cover art for a media content item comprising:
   at a server including at least one processor and memory storing programs for execution by the at least one processor:
      receiving, from a media browser application executing on a client device, a user request for a collection of media content items;
      in response to the user request, returning the collection of media content items;
      for each of the returned media content items:
         determining a title of the media content item;
         determining that the media content item does not have associated computer displayable cover art, including:
            submitting a query to at least one of an associated database, a third party database or a search engine to retrieve cover art associated with the media content item;
            receiving results responsive to the query; and
            in accordance with the received results, determining that the associated computer displayable cover art is not available from the at least one of an associated database, a third party database, or a search engine;
         determining a genre of the media content item;
         generating cover art that presents the title and has one or more attributes including a title font and a background, wherein the one or more attributes distinguish visually the media content item from media content items associated with other genre, and the one or more attributes are chosen without attempting to convey any associated meaning of the genre; and
         transmitting to the client device for display within the media browser application the generated cover art with the title of the media content item on the electronic display of the client device;
      wherein the media content item is one of a movie, a television program, an episode of a television program serial, a video, a music file, a music compilation, an audio file and a collection of images.

2. The method of claim 1, wherein the associated database includes a licensed database including licensed content.

3. The method of claim 1, wherein determining that the media content item does not have associated computer displayable cover art includes generating a query using metadata associated with the media content item.

4. The method of claim 1, wherein determining the title includes applying an optical character recognition technique to one or more frames of the media content item.

5. The method of claim 1, wherein determining the title includes submitting a query to at least one of an associated database, a third party database, or a search engine.

6. The method of claim 1, wherein determining the genre includes applying an optical character recognition technique to one or more frames of the media content item.

7. The method of claim 1, wherein determining the genre includes submitting a query to at least one of an associated database, a third party database, or a query to a search engine.

8. The method of claim 1, wherein generating cover art that presents the title and has attributes that are representative of the genre includes selecting at least one of a font, a background, or an image from a local database based on the genre.

9. The method of claim 1, wherein generating cover art that presents the title and has attributes that are representative of the genre includes submitting a query to at least one of an associated database, a third party database, or a search engine in order to identify and select at least one of a font, a background, or an image from a local database based on the genre.

10. The method of claim 1, further comprising: associating with the generated cover art a sound signature associated with the genre of the media content item.

11. The method of claim 1, further comprising generating the background using an abstract collection of patterns and colors.

12. The method of claim 1, further comprising obtaining user preferences related to generated cover art and generating the one or more attributes of the cover art based at least in part on the user preferences.

13. The method of claim 1, wherein receiving the user request is in response to identification in the media browser application of media content playing in proximity to the client device based on audio information captured from the playing by the client device.

14. The method of claim 1, further comprising, when the relevant cover art is available, filtering the relevant cover art based on a quality measure of the pre-existing cover art.

15. A non-transitory computer readable storage medium storing one or more programs configured for execution by a server with one or more processors, the one or more programs comprising computer program instructions that when executed by the one or more processors cause the server to:
receive, from a media browser application executing on a client device, a user request for a collection of media content items;
in response to the user request, return the collection of media content items;
for each of the returned media content items:
determine a title of the media content item;
determine that the media content item does not have associated computer displayable cover art, including:
submit a query to at least one of an associated database, a third party database or a search engine to retrieve cover art associated with the media content item;
receive results responsive to the query; and
in accordance with the received results, determine that the associated computer displayable cover art is not available from the at least one of an associated database, a third party database, or a search engine;
determine a genre of the media content item;
generate cover art that presents the title and has one or more attributes including a title font and background, wherein the one or more attributes distinguish visually the media content item from media content items associated with other genre, and the one or more attributes are chosen without attempting to convey any associated meaning of the genre;
transmit to the client device for display within the media browser application the generated cover art with the title of the media content item on the electronic display of the client device;
wherein the media content item is one of a movie, a television program, an episode of a television program serial, a video, a music file, a music compilation, an audio file and a collection of images.

16. The computer readable storage medium of claim 15, wherein determining that the media content item does not have associated computer displayable cover art includes generating a query using metadata associated with the media content item.

17. The computer readable storage medium of claim 15, wherein determining the title includes applying an optical character recognition technique to one or more frames of the media content item.

18. The computer readable storage medium of claim 15, wherein determining the genre includes applying an optical character recognition technique to one or more frames of the media content item.

19. The computer readable storage medium of claim 15, wherein generating cover art that presents the title and has attributes that are representative of the genre includes selecting at least one of a font, a background, or an image from a local database based on the genre.

20. The computer readable storage medium of claim 15, wherein generating cover art that presents the title and has attributes that are representative of the genre includes submitting a query to at least one of an associated database, a third party database, or a search engine in order to identify and select at least one of a font, a background, or an image from a local database based on the genre.

21. A server system for generating computer displayable cover art for a media content item comprising:
one or more processors and non-transitory memory storing computer program instructions for execution by the one or more processors, and upon execution the computer program instructions causing the server system to:
receive, from a media browser application executing on a client device, a user request for a collection of media content items;
in response to the user request, return the collection of media content items;
for each of the returned media content items:
determine a title of the media content item;
determine that the media content item does not have associated computer displayable cover art, including:
submit a query to at least one of an associated database, a third party database or a search engine to retrieve cover art associated with the media content item;
receive results responsive to the query; and
in accordance with the received results, determine that the associated computer displayable cover art is not available from the at least one of an associated database, a third party database, or a search engine;
determine a genre of the media content item;
generate cover art that presents the title and has one or more attributes including a title font and a background, wherein the one or more attributes distinguish visually the media content item from media content items associated with other genre, and the one or more attributes are chosen without attempting to convey any associated meaning of the genre; and
transmit to the client device for display within the media browser application the generated cover art with the title of the media content item on the electronic display of the client device;
wherein the media content item is one of a movie, a television program, an episode of a television program serial, a video, a music file, a music compilation, an audio file and a collection of images.

22. The system of claim 21, wherein determining that the media content item does not have associated computer displayable cover art includes generating a query using metadata associated with the media content item.

23. The system of claim 21, wherein generating cover art that presents the title and has attributes that are representative of the genre includes selecting at least one of a font, a background, or an image from a local database based on the genre.

24. The system of claim 21, wherein generating cover art that presents the title and has attributes that are representative of the genre includes submitting a query to at least one of an associated database, a third party database, or a search engine in order to identify and select at least one of a font, a background, or an image from a local database based on the genre.

* * * * *